July 8, 1930.   R. KONDO   1,770,237
COOLING DEVICE FOR INTERNAL COMBUSTION ENGINES
Filed April 3, 1928
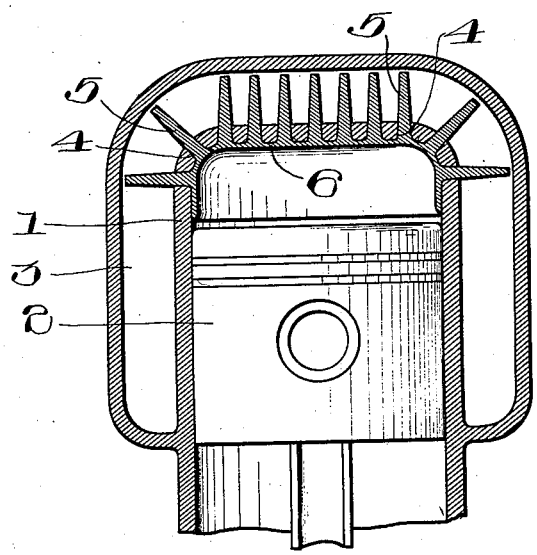

Patented July 8, 1930

1,770,237

UNITED STATES PATENT OFFICE

RENNOSUKE KONDO, OF TOKYO, JAPAN

COOLING DEVICE FOR INTERNAL-COMBUSTION ENGINES

Application filed April 3, 1928, Serial No. 266,990, and in Japan December 27, 1927.

The present invention relates to a cooling device for internal combustion engines in which the walls in contact with burning gases are provided with a number of holes, through which heat conducting pieces of a good metallic heat conductor are inserted from the inside and rigidly fixed. One end of each of the said heat conducting pieces projects outside the wall and is exposed to a cooling medium such as water, air, etc. and a heat conducting layer of a good metallic heat conductor is formed at the inner ends of said heat conducting pieces inside the said wall as by means of plating.

The object of the invention is to increase the heat conduction of the wall in contact with the burned gases without decreasing the strength of the said wall and to improve the cooling efficiency of the engines.

The accompanying drawing shows a sectional elevation of an example of a combustion chamber provided with applicant's device.

In an internal combustion engine, the efficiency of the engine has a close connection with the cooling of a cylinder. If the cooling is effective, the compression ratio and the rotating speed of the engine may be increased, and as it is a general tendency to increase the rotating speed of the engine, it is quite necessary to make the cooling effective and also to make the engine stronger.

Although good cooling may be obtained by making the combustion chamber of the engine of metals which have high thermal conductivity, the strength of such materials is inferior to that of steel, cast iron etc., so that the engine is not strong enough, if made of them, and in order to have sufficient strength, the thickness must be increased. This makes the cooling inefficient. In the present invention, strong materials such as steel, cast iron etc. are used for the main structural member and heat conducting pieces made of materials of high thermal conductivity such as copper, nickel, silver etc. are passed through the said structural member so that heat can be quickly transmitted to the cooling medium, thus increasing the cooling capacity of the wall without decreasing its strength.

The drawing illustrates an example of my invention, in which (1) is a cylinder made of a strong material as usual. (2) is a piston; and (3), a water-jacket. A number of small holes (4) are pierced through the cylinder wall (1) and heat conducting pieces (5) made of material of high thermal conductivity are passed through each of the said small holes (4) from the inside so as to project into the water-jacket (3), the inner ends of the said pieces being at the inner surface of the cylinder wall. The said pieces (5) are rigidly fixed to the cylinder wall by the wedging action between conically formed pieces and the corresponding small holes or by means of screw threads or the like and are enabled to stand the pressure in the cylinder. To the internal surface of the cylinder wall through which the said heat conducting pieces are pierced, the same metal as that of the said heat conducting pieces or other metal of high thermal conductivity is attached by means of, for instance, plating and it forms a heat conducting layer (6). The said layer connects the inner end of each of the heat conducting pieces and closes the clearances apt to be formed between the said heat conducting pieces and the holes of the cylinder wall, making the cylinder wall gas-tight.

In the device described above, the heat generated in the combustion chamber is transmitted through the layer (6) and pieces (5) to the outside of the cylinder wall and then to the water in the jacket from the external surface of large area on the said pieces projecting outside of the cylinder wall. Thus, the cylinder wall is cooled rapidly.

In the above example, the device is provided with a water jacket, but it can also be used in the air-cooled engines which dispense with jackets. In this case heat will be carried away by the air from numerous heat conducting pieces. Moreover, the present device is applicable to the working piston as well as the cylinder head.

As stated above, in the present invention, a number of holes are pierced through the wall which contacts with the explosion gases, and the pieces of metal of high thermal conductivity are inserted into them and the extension of large surface area of the said pieces is exposed to the cooling medium, so that the cooling of the wall is improved. Further, the said wall can be made of ordinary strong materials and the reduction of strength by the provision of holes (4) can be compensated for by increasing the thickness of the wall without losing cooling capacity. Therefore, the strength of the combustion chamber is not reduced at all. Furthermore, the construction of the layer (6) on the internal surface of the combustion chamber as described above provides a smooth surface by polishing and accordingly prevents the deposition of free carbon.

Claim:

A cooling device for internal combustion engines comprising a wall made of good heat conducting metal and provided with a plurality of holes and contacting with the burned gases of the engine, a plurality of heat conducting pieces of metal of high thermal conductivity inserted fixedly into the said holes and extending into a cooling medium, and a layer of metal of high thermal conductivity attached to the internal surface of the said wall and connecting the inner ends of said heat conducting pieces.

In testimony whereof I have affixed my signature.

RENNOSUKE KONDO.